(12) United States Patent
Jiao et al.

(10) Patent No.: US 7,454,599 B2
(45) Date of Patent: Nov. 18, 2008

(54) SELECTING MULTIPLE THREADS FOR SUBSTANTIALLY CONCURRENT PROCESSING

(75) Inventors: Yang (Jeff) Jiao, San Jose, CA (US);
Yiping Chen, San Jose, CA (US);
Wen-Chung Chen, Cupertino, CA (US)

(73) Assignee: Via Technologies, Inc., Hsien-Tien, Taipei (TW)

( * ) Notice: Subject to any disclaimer, the term of this patent is extended or adjusted under 35 U.S.C. 154(b) by 499 days.

(21) Appl. No.: 11/229,808

(22) Filed: Sep. 19, 2005

(65) Prior Publication Data

US 2007/0067607 A1 Mar. 22, 2007

(51) Int. Cl.
*G06F 9/312* (2006.01)
*G06F 9/315* (2006.01)

(52) U.S. Cl. ...................... 712/216; 711/168
(58) Field of Classification Search ................. 712/216; 711/168
See application file for complete search history.

(56) References Cited

U.S. PATENT DOCUMENTS

| | | | | |
|---|---|---|---|---|
| 6,085,276 A | * | 7/2000 | VanDoren et al. | 710/240 |
| 6,094,716 A | * | 7/2000 | Witt | 712/23 |
| 6,272,617 B1 | * | 8/2001 | Deosaran et al. | 712/23 |
| 6,393,512 B1 | * | 5/2002 | Chen et al. | 711/5 |
| 6,430,649 B1 | * | 8/2002 | Chaudhry et al. | 711/100 |
| 6,463,514 B1 | * | 10/2002 | Ray et al. | 711/168 |
| 6,633,576 B1 | * | 10/2003 | Melaragni et al. | 370/412 |
| 6,763,034 B1 | * | 7/2004 | Jones et al. | 370/463 |
| 6,772,227 B2 | * | 8/2004 | Alkhatib | 709/245 |
| 6,888,797 B1 | * | 5/2005 | Cao et al. | 370/235 |
| 6,928,645 B2 | * | 8/2005 | Wang et al. | 718/102 |
| 2005/0010743 A1 | * | 1/2005 | Tremblay et al. | 712/10 |

* cited by examiner

*Primary Examiner*—Eric Coleman
(74) *Attorney, Agent, or Firm*—Thomas, Kayden, Horstemeyer & Risley

(57) ABSTRACT

The present disclosure provides for processing units, which are capable of concurrently executing instructions, and a source arbitrator. The source arbitrator determines whether instructions for the processing units are read from different sources. If the source arbitrator determines that each processing unit reads its respective instruction from a different source, then the instructions from the various sources are provided to their corresponding processing units for substantially concurrent processing.

23 Claims, 7 Drawing Sheets

SELECTING MULTIPLE THREADS FOR SUBSTANTIALLY CONCURRENT PROCESSING

CROSS-REFERENCE TO RELATED APPLICATIONS

This application incorporates by reference, in their entireties, the following U.S. patent applications:

U.S. patent application Ser. No. 11/229,884, filed on Sep. 19, 2005, having the title "Merging Entries in Processor Caches"; and U.S. patent application Ser. No. 11/229,939, filed on Sep. 19, 2005, having the title "Buffering Missed Requests in Processor Caches."

FIELD OF THE DISCLOSURE

The present disclosure relates generally to computer processors and, more particularly, to processors capable of parallel processing.

BACKGROUND

Increasing complexity in software applications, such as in graphics processing, has led to an increased demand for processing power. In an effort to meet that demand, processing hardware has correspondingly increased in sophistication. For example, multi-issue processors, which are capable of issuing multiple instructions within a single clock cycle, provide greater processing speed due to their capacity to concurrently process multiple instructions.

Despite such technological advances in processor hardware, there is a continuing need for more powerful hardware in order to accommodate increasingly complex software applications.

SUMMARY

The present disclosure relates to multi-issue processors that are capable of substantially concurrently processing multiple instructions. Some embodiments, among others, include processing units, which are capable of concurrently executing instructions, and a source arbitrator.

The source arbitrator determines whether instructions for the processing units are read from different sources. If the source arbitrator determines that each processing unit reads its instruction from a different source, then the instructions from the various sources are provided to their corresponding processing units for substantially concurrent processing.

Other embodiments include a destination arbitrator, which determines whether the processing units write to different destinations. If the destination arbitrator determines that each processing unit writes to a different destination, then the instructions from the various sources are provided to their corresponding processing units for substantially concurrent processing.

Yet other embodiments include both a source arbitrator and a destination arbitrator. For those embodiments, the instructions from the various sources are provided to their corresponding processing units if both the sources and the destinations are different for each of the processing units.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
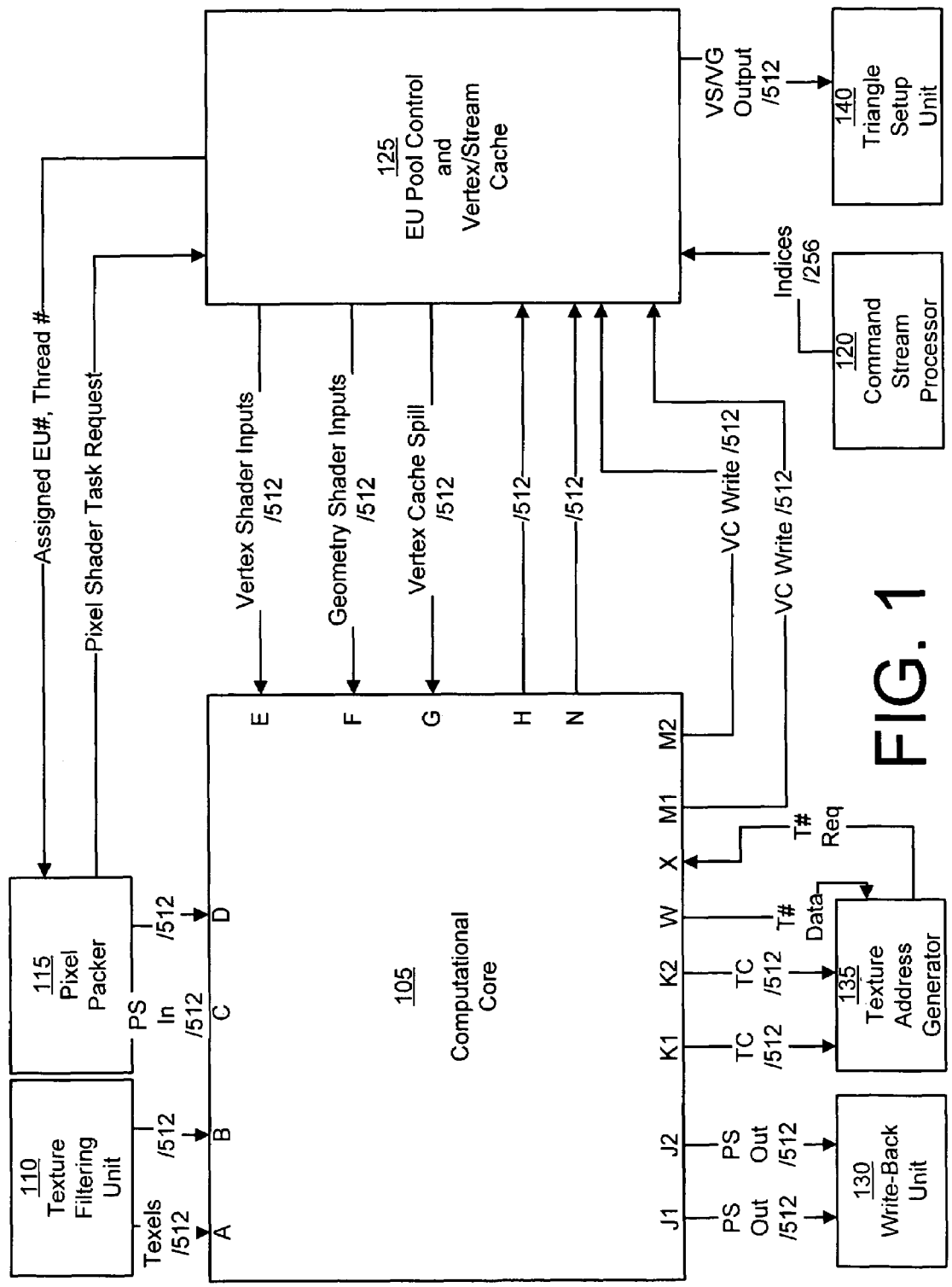
FIG. 1 is a block diagram showing an example processor environment.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Multi-issue processors provide for faster processing speeds, insofar as such processors permit concurrent execution of multiple threads. Various instructions associated with each thread are read from one or more source registers. Once the instruction is executed, the result is written to one or more destination registers.

Often, these multi-issue processors have multiple processing units that concurrently process threads, thereby providing increased efficiency over processors that are incapable of parallel processing. The disclosed embodiments describe approaches to improving processor efficiency.

As disclosed in greater detail below, systems and methods are provided in which threads that have non-conflicting instructions are paired for concurrent execution. As described herein, non-conflicting instructions are those that are read from different source registers (or banks) and/or written to different destination registers (or banks). The following non-limiting example is provided for purposes of clarity.

Given:

THREAD0 reads from BANK0 and BANK4 and writes back to BANK0;

THREAD2 reads from BANK0 and BANK2 and writes back to BANK0; and

THREAD6 reads from BANK2 and BANK6 and writes back to BANK2.

There is a source conflict between THREAD0 and THREAD2, since both of these threads read from BANK0. Additionally, there is a destination conflict between THREAD0 and THREAD2, since both of these threads writes to bank0. Thus, THREAD0 and THREAD2 are conflicting threads.

Similarly, there is a source conflict between THREAD2 and THREAD6, since both of these threads read from BANK2. Thus, THREAD2 and THREAD6 are also conflicting threads.

However, there is no conflict between THREAD0 and THREAD6, since the source registers for THREAD0 are different from the source registers for THREAD6, and, also, since the destination register for THREAD0 and the destination register for THREAD6 is also different.

Given the above example, if THREAD0 is selected for execution by one processing unit, then non-conflicting THREAD6 would be selected for concurrent execution by another processing unit. In the event that no non-conflicting thread for THREAD0 is found, then instruction for THREAD0 is issued alone.

The arbitration (or selection) of the thread is accomplished by one or more arbitrators, which are configured to determine whether the threads have conflicting sources and/or destinations. These are described in greater detail below.

FIG. 1 is a block diagram showing an example processor environment for a graphics processor. While not all components for graphics processing are shown, the components shown in FIG. 1 should be sufficient for one having ordinary skill in the art to understand the general functions and architecture related to such graphics processors. At the center of the processing environment is a computational core 105, which processes various instructions. That computational core 105, for multi-issue processors, is capable of processing multiple instructions within a single clock cycle.

As shown in FIG. 1, the relevant components of the graphics processor include the computational core 105, a texture filtering unit 110, a pixel packer 115, a command stream processor 120, a write-back unit 130, and a texture address generator 135. Also included in FIG. 1 is an execution unit (EU) pool control unit 125, which also includes a vertex cache and/or a stream cache. The computational core 105 receives inputs from various components and outputs to various other components.

For example, as shown in FIG. 1, the texture filtering unit 110 provides texel data to the computational core 105 (inputs A and B). For some embodiments, the texel data is provided as 512-bit data, thereby corresponding to the data structures defined below.

The pixel packer 115 provides pixel shader inputs to the computational core 105 (inputs C and D), also in 512-bit data format. Additionally, the pixel packer 115 requests pixel shader tasks from the EU pool control unit 125, which provides an assigned EU number and a thread number to the pixel packer 115. Since pixel packers and texture filtering units are known in the art, further discussion of these components is omitted here. While FIG. 1 shows the pixel and texel packets as 512-bit data packets, it should be appreciated that the size of the packets can be varied for other embodiments, depending on the desired performance characteristics of the graphics processor.

The command stream processor 120 provides triangle vertex indices to the EU pool control unit 125. In the embodiment of FIG. 1, the indices are 256-bits. The EU pool control unit 125 assembles vertex shader inputs from the stream cache and sends data to the computational core 105 (input E). The EU pool control unit 125 also assembles geometry shader inputs and provides those inputs to the computational core 105 (input F). The EU pool control 125 also controls the EU input 235 and the EU output 220. In other words, the EU pool control 125 controls the respective inflow and outflow to the computational core 105.

Upon processing, the computational core 105 provides pixel shader outputs (outputs J1 and J2) to the write-back unit 130. The pixel shader outputs include red/green/blue/alpha (RGBA) information, which is known in the art. Given the data structure in the disclosed embodiment, the pixel shader output is provided as two 512-bit data streams.

Similar to the pixel shader outputs, the computational core 105 outputs texture coordinates (outputs K1 and K2), which include UVRQ information, to the texture address generator 135. The texture address generator 135 issues a texture request (T# Req) to the computational core 105 (input X), and the computational core 105 outputs (output W) the texture data (T# data) to the texture address generator 135. Since the various examples of the texture address generator 135 and the write-back unit 130 are known in the art, further discussion of those components is omitted here. Again, while the UVRQ and the RGBA are shown as 512 bits, it should be appreciated that this parameter may also be varied for other embodiments. In the embodiment of FIG. 1, the bus is separated into two 512-bit channels, with each channel holding the 128-bit RGBA color values and the 128-bit UVRQ texture coordinates for four pixels.

The computational core 105 and the EU pool control unit 125 also transfer to each other 512-bit vertex cache spill data. Additionally, two 512-bit vertex cache writes are output from the computational core 105 (outputs M1 and M2) to the EU pool control unit 125 for further handling.

Figure 2:
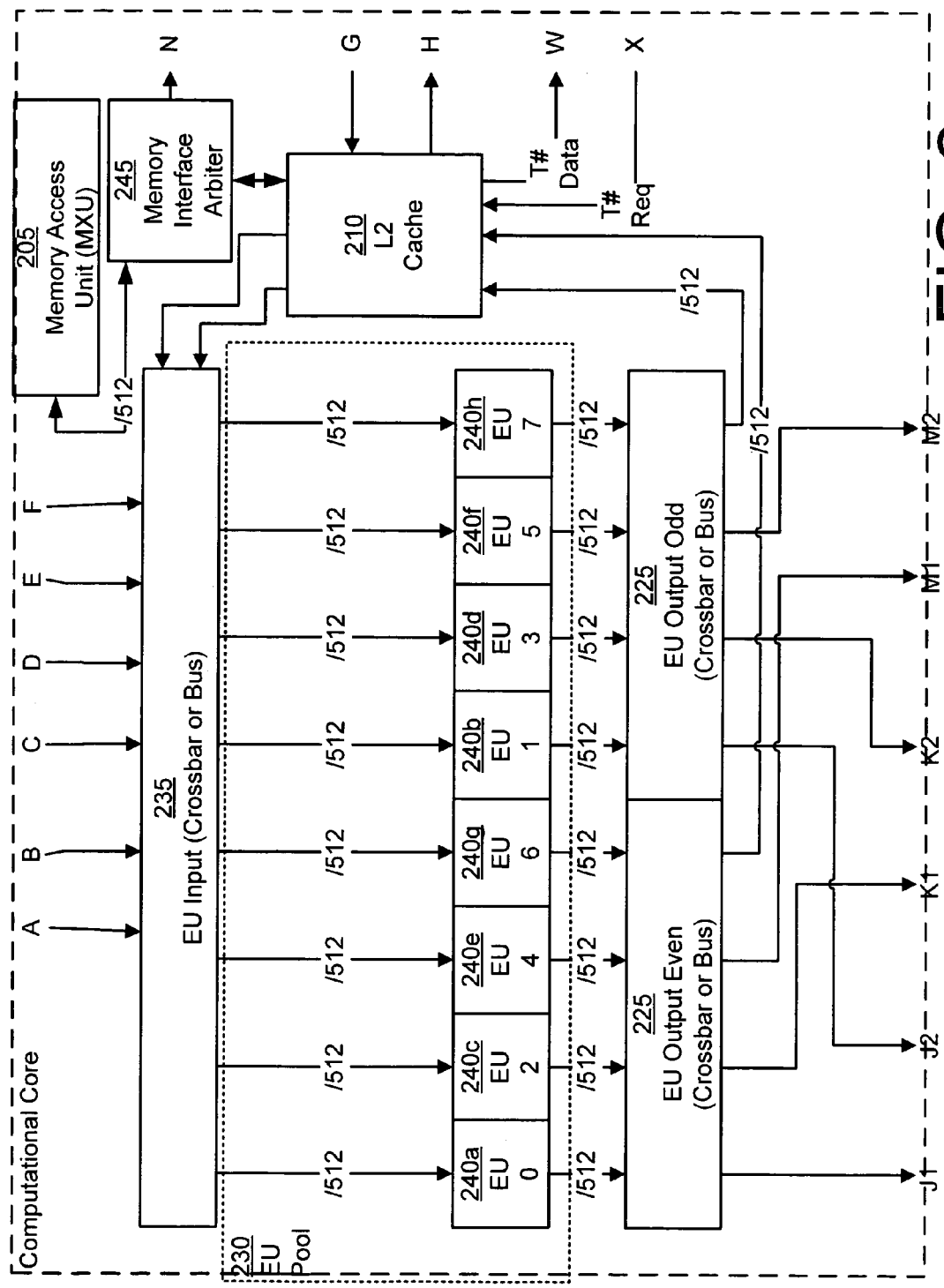
FIG. 2 is a block diagram showing components within the computational core of FIG. 1.

Having described the data exchange external to the computational core 105, attention is turned to FIG. 2, which shows a block diagram of various components within the computational core 105. As shown in FIG. 2, the computational core 105 comprises a memory access unit 205 that is coupled to a level-2 (L2) cache 210 through a memory interface arbiter 245.

The L2 cache 210 receives vertex cache spill (input G) from the EU pool control unit 125 (FIG. 1) and provides vertex cache spill (output H) to the EU pool control unit 125 (FIG. 1). Additionally, the L2 cache receives T# requests (input X) from the texture address generator 135 (FIG. 1), and provides the T# data (output W) to the texture address generator 135 (FIG. 1) in response to the received request.

The memory interface arbiter 245 provides a control interface to the local video memory (frame buffer). While not shown, a bus interface unit (BIU) provides an interface to the system through, for example, a PCI express bus. The memory interface arbiter 245 and BIU provide the interface between the memory and an execution unit (EU) pool L2 cache 210. For some embodiments, the EU pool L2 cache connects to the memory interface arbiter 245 and the BIU through the memory access unit 205. The memory access unit 205 translates virtual memory addresses from the L2 cache 210 and other blocks to physical memory addresses.

The memory interface arbiter 245 provides memory access (e.g., read/write access) for the L2 cache 210, fetching of instructions/constants/data/texture, direct memory access (e.g., load/store), indexing of temporary storage access, register spill, vertex cache content spill, etc.

The computational core 105 also comprises an execution unit pool 230, which includes multiple execution units (EUs) 240a . . . 240h (collectively referred to herein as 240), each of which includes an EU control and local memory (not shown). Each of the EUs 240 are capable of processing multiple instructions within a single clock cycle. Thus, the EU pool 230, at its peak, can process multiple threads substantially simultaneously. These EUs 240, and their substantially concurrent processing capacities, are described in greater detail below. While eight (8) EUs 240 are shown in FIG. 2 (labeled EU0 through EU7), it should be appreciated that the number of EUs need not be limited to eight, but may be greater or fewer in number for other embodiments.

The computational core 105 further comprises an EU input 235 and an EU output 220, which are respectively configured to provide the inputs to the EU pool 230 and receive the outputs from the EU pool 230. The EU input 235 and the EU output 220 may be crossbars or buses or other known input mechanisms.

The EU input 235 receives the vertex shader input (E) and the geometry shader input (F) from the EU pool control 125 (FIG. 1), and provides that information to the EU pool 230 for processing by the various EUs 240. Additionally, the EU input 235 receives the pixel shader input (inputs C and D) and the texel packets (inputs A and B), and conveys those packets to the EU pool 230 for processing by the various EUs 240. Additionally, the EU input 235 receives information from the L2 cache 210 (L2 read) and provides that information to the EU pool 230 as needed.

The EU output in the embodiment of FIG. 2 is divided into an even output 225a and an odd output 225b. Similar to the EU input 235, the EU output 225 can be crossbars or buses or other known architectures. The even EU output 225a handles the output from the even EUs 240a, 240c, 24e, 240g, while the odd EU output 225b handles the output from the odd EUs 240b, 240d, 240f, 240h. Collectively, the two EU outputs 225a, 225b receive the output from the EU pool 230, such as the UVRQ and the RGBA. Those outputs, among others, may be directed back to the L2 cache 210, or output from the computational core 105 to the write-back unit 130 (FIG. 1) through J1 and J2 or output to the texture address generator 135 (FIG. 1) through K1 and K2.

Figure 3:
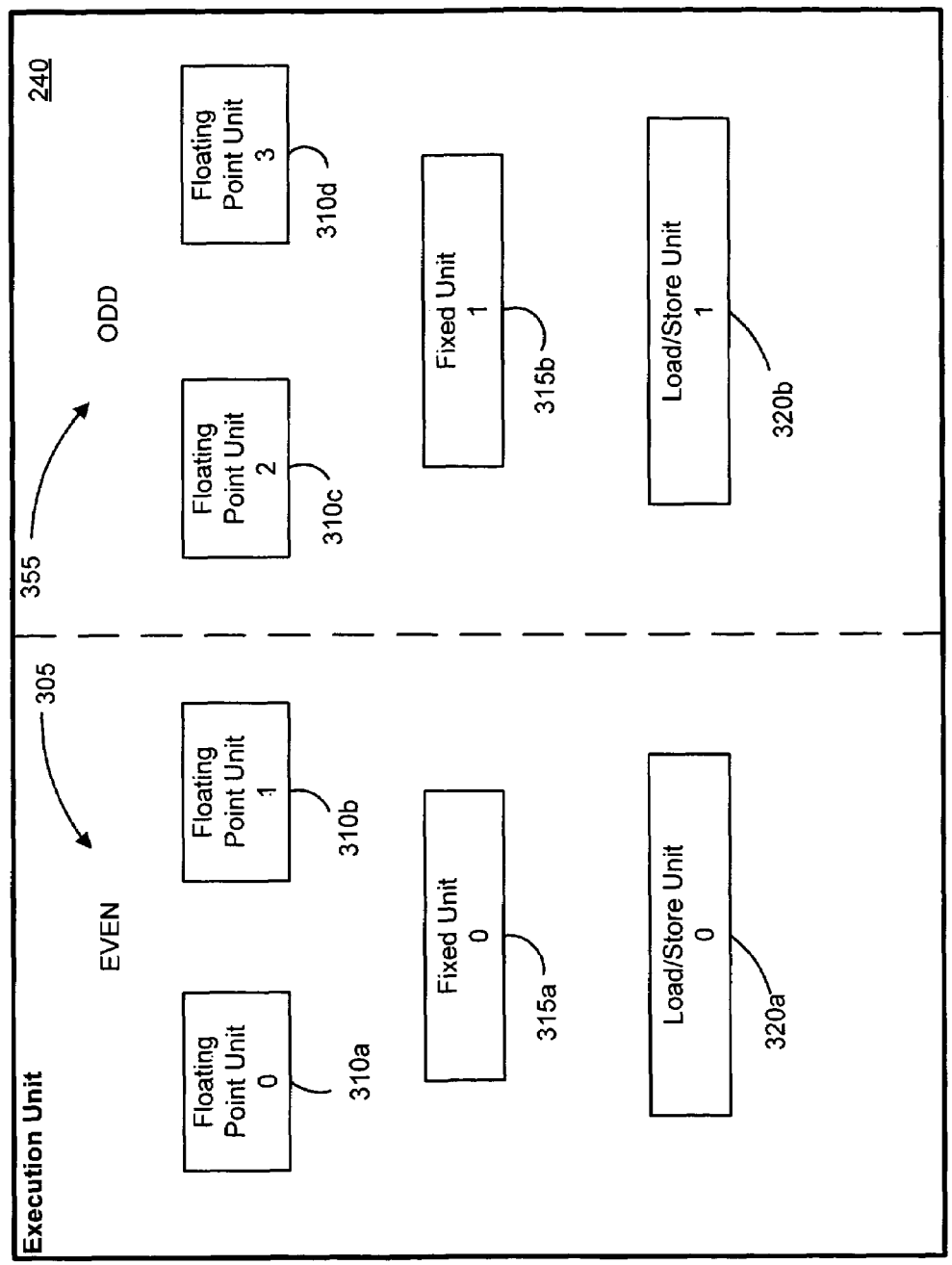
FIG. 3 is a block diagram showing components within one of the execution units (EU) of FIG. 2.

FIG. 3 is a block diagram showing an embodiment of components within one of the execution units (EUs) 240 of FIG. 2. The particular embodiment of FIG. 3 shows an EU 240 with four floating point (FP) units 310a . . . 310d, two fixed units 315a . . . 315b, and two load/store units 320a . . . 320b. Thus, the EU 240 of FIG. 3 is capable of concurrently executing four FP instructions during a single clock cycle. For some embodiments, the EU 240 is logically separated so that half of the EU components 305 process "even" threads, while the other half of the EU components 355 process "odd" threads. Even threads and odd threads are explained in greater detail below. Given such a configuration, each side 305, 355 is capable of processing two FP threads substantially concurrently.

Given the architecture of FIGS. 1 through 3, one can see that the greatest efficiency in processing occurs when all of the EUs 240 are concurrently processing instructions. In other words, the throughput of the EU pool 230 is maximized when all of the EUs 240 are performing at full capacity. Thus, in order to achieve such a capacity, it is desirable to provide instructions that can be concurrently processed by all of the processing units (e.g., FP units 310a . . . 310d, fixed units 315a . . . 315b). Sometimes, however, these processing units cannot concurrently process instructions due to a conflict in resources. While these conflicts are discussed in greater detail with reference to FIG. 4, a brief introduction of EU input and output is provided to more clearly illustrate how a conflict can arise.

The inputs to the EUs 240 and the outputs from the EUs 240 are respectively read from and written to one or more registers within a register file. In some embodiments, the register file can be an eight-bank register file, with each bank being a 128-by-128-bit register file that has one read port (1R), one write port (1W), and one read/write port (1RW). In one embodiment, among others, the threads are labeled as either "even" threads or "odd" threads, and the register banks are divided so that some of the banks are dedicated to the even threads, while the other banks are dedicated to the odd threads.

The 1R+1W ports, in the above embodiments, are used by the EU data path (EUDP) for read and write access initiated by instruction execution. The thread controller is responsible for pairing instructions from different threads and making sure that there is no read or write bank conflict on the register files. Additionally, the compiler is responsible for avoiding conflict within the thread context.

The 1RW port can be used by the EU input and output control logic for loading the initial thread input data and writing the final thread output to the EU pool or other modules. By using separated ports for the EUDP and input/output (I/O) read/write access, loading and unloading of thread I/O and execution of threads can be done in parallel. This also avoids any unnecessary arbitration between the EUDP and the I/O requests, which can significantly increase hardware complexity. The 1RW I/O port is shared by both EU input and output, and, for some embodiments, the write has higher priority than the read.

Given such a structure for the register file, the corresponding data structure can be a 1024-bit line with two 512-bit data entries. Each of the two 512-bit entries can be further divided into four 128-bit entries, each to match the 128-by-128-bit registers in the bank. Each 128-bit entry comprises a register file index and a thread identifier (ID). For some embodiments, the register file index can be designated as the first 8 bits (from the least significant bit (LSB)), and the thread ID can be designated as the next contiguous 5 LSBs. Thus, the combination of the 8-bit register file index and the 5-bit thread ID, for such embodiments, would create a unique 13-bit address. This 13-bit address of each entry matches a particular thread with a corresponding register file.

Thus, since each 1024-bit line has an address, and there exists two 512-bit entries (words) on each line, each word is stored across four banks, and the two LSBs of the register file index are added to the bank offset of current threads to create the bank selection. This type of matching scheme permits registers of different threads to share one common register file, thereby making more efficient use of the memory. Since the EU pool's resource monitor is responsible for tracking memory usage of the register file and, preferably, guarantees register availability prior to scheduling a new task to the EU pool, there will likely be free lines available when write allocation occurs, thereby reducing or eliminating register overlap.

The 512 bits of input data goes to four different banks (e.g., BANK0 through BANK3) in order to avoid any conflict when loading data into the register file. For such embodiments, a 2-bit channel index is passed in as part of the register file index, along with the data and the 512-bit aligned base address, to specify the starting bank of the input data. For example, assuming that the thread based bank offset is 0, if the starting channel is designated as 1, then the first 128 bits from the least significant bit (LSB) is loaded into BANK1. Consequently, the second 128 bits are loaded into BANK2; the third 128 bits are loaded into BANK3; and the last bank is loaded into BANK0.

For some embodiments, the two least-significant bits of the 5-bit thread ID can be used to generate a bank offset, thereby randomizing the starting bank location for each thread. This randomization further decreases any chances for conflict (or collision).

Given such a data structure, both the source register and the destination register can be readily discerned from the data structure itself. In that regard, in order to concurrently issue multiple instructions, it is desirable to find threads that have no overlap in the source registers, no overlap in the destination registers, or no overlap in both the source and the destination registers. This can be done through a state machine, which is shown in FIG. 4 and designated as an arbitrator.

Figure 4:
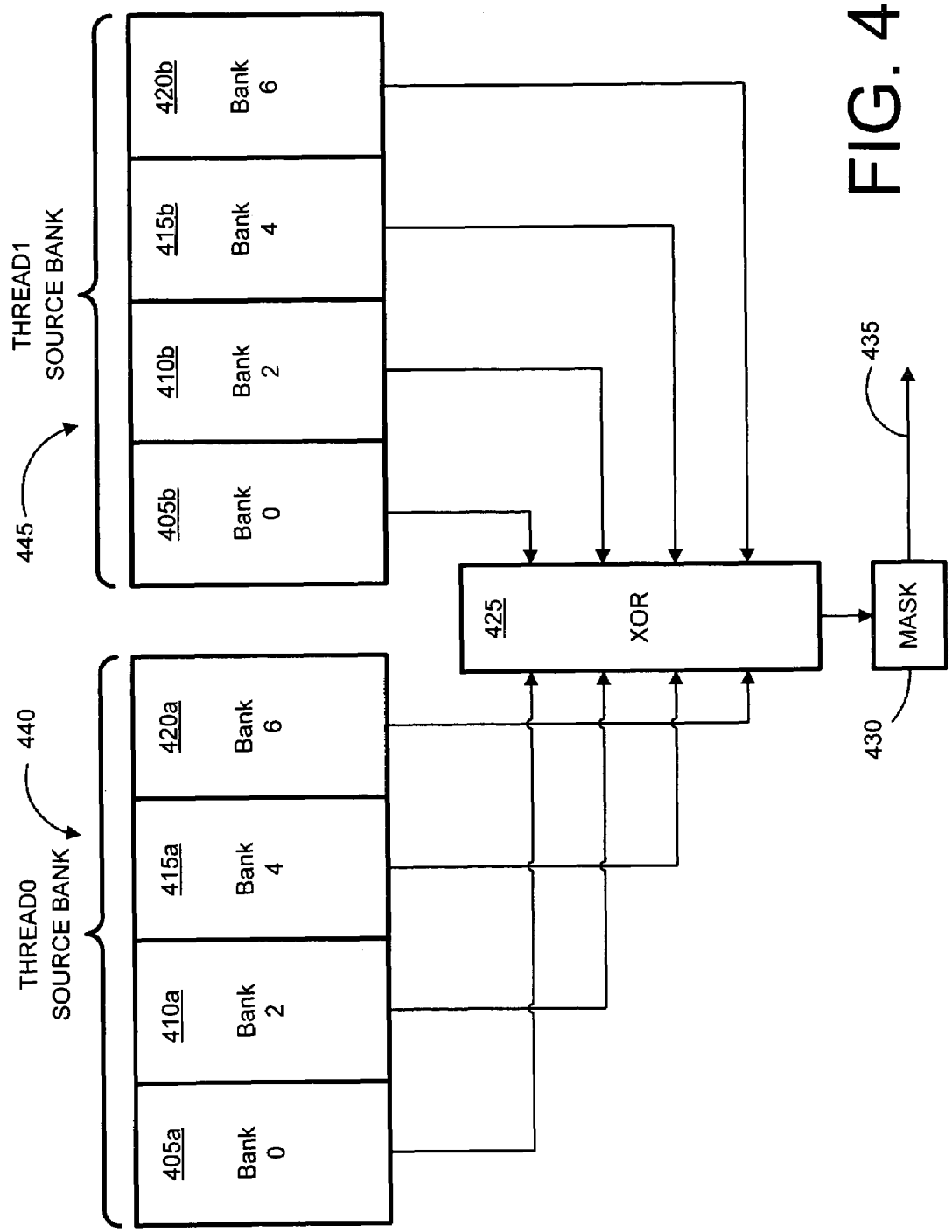
FIG. 4 is a block diagram showing an example embodiment of an arbitrator that determines whether or not a conflict exists between source banks for two different threads.

FIG. 4 is a block diagram showing an embodiment of an arbitrator that determines whether or not a conflict exists between source banks for two different threads. It should be noted that, for some embodiments, the arbitrator can be a separate state machine that resides outside of the computational core 105 (FIG. 1). Regardless of the actual location of the arbitrator, the function of the arbitrator is to determine whether or not there is a thread conflict, and convey any conflict information to the relevant components so that non-conflicting threads can be appropriately placed in the data path for processing by the EUs 240. Conflicting threads can arise, for some embodiments, when source operands or source registers for two different threads overlap.

In some embodiments, as noted above, the data itself includes a file index and a thread ID, which specifically designate source and destination registers. For example, if the address bits for THREAD0 show that THREAD0 reads from BANK0 and BANK2 of a register file, and the address bits for THREAD1 shows that THREAD1 reads from BANK2 and BANK6, then a logical exclusive-OR (XOR) operation on those address bits will show that there is a source conflict between THREAD0 and THREAD1.

Given the bit-locations of the file index and the thread ID, a source conflict can be determined by performing a logical XOR operation on those address bits. Thus, as shown in FIG. 4, one embodiment, among others, includes an XOR gate 425 that receives, as its inputs, the address bits from two threads (e.g., THREAD0 and THREAD1). The address bits are logically-XORed. The output of the XOR computational block 425 is fed to a mask 430, which outputs a bit-stream 435 that is indicative of whether or not a conflict exists. Of course, other (non-XOR) Boolean or logical operations may be executed consistent with the scope and spirit of the present invention, in order to assess the potential for a conflict.

While a source conflict is shown in FIG. 4, it should be appreciated that a destination conflict can be determined using a similar approach. It should also be appreciated that numerous threads can be compared in the same clock cycle by using multiple arbitrators. In that regard, when two threads, which have no source (or destination) conflicts, are found using such an arbitration scheme, those two threads are placed in the data path for concurrent execution. Conversely, if all available threads have conflicts, then the execution units will, for some embodiments, process a single thread until non-conflicting threads are found.

While systems for arbitrating threads are disclosed above, various embodiments of the invention can be viewed as methods for arbitrating threads. Several embodiments of such methods are described with reference to FIGS. 5 6, and 7, below.

Figure 5:
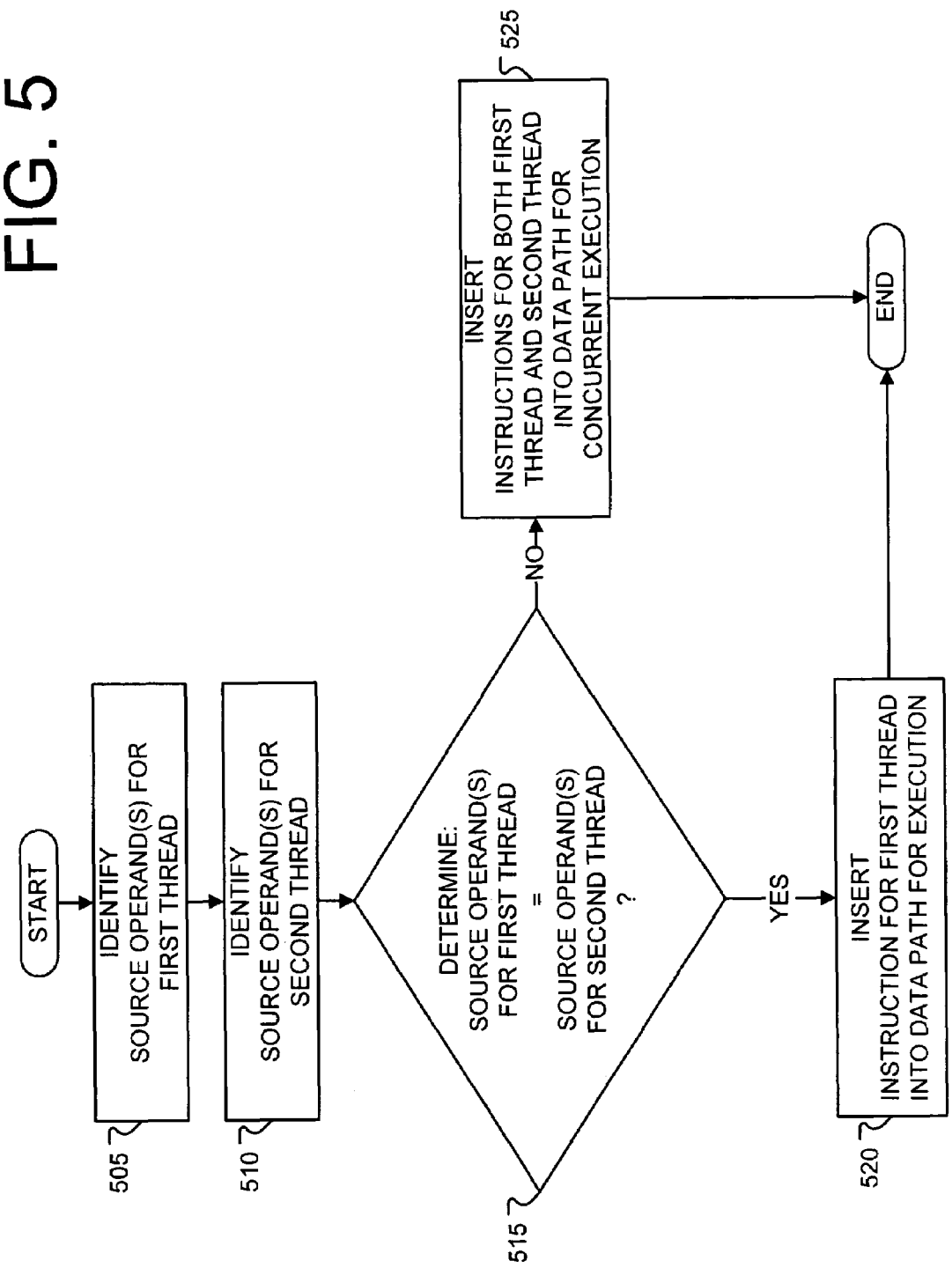
FIG. 5 is a flowchart showing an embodiment of a process for determining whether or not a conflict exists between two threads.

FIG. 5 is a flowchart showing an embodiment of a process for determining whether or not a conflict exists between two threads. As shown in FIG. 5, for some embodiments, the process begins by identifying (505) one or more source operands for a first thread, and identifying (510) one or more source operands for a second thread. The identified source operand(s) for the first thread are compared with the identified source operand(s) for the second thread to determine (515) whether or not there is overlap between the operands of the two threads. If the source operand(s) of the first thread are distinct from the source operand(s) of the second thread, then instructions for both the first and second thread are inserted (525) into a data path for substantially concurrent execution. For some embodiments, substantially concurrent execution refers to execution during the same clock cycle. Alternatively, if there is overlap between the source operand(s) of the first thread and the source operand(s) of the second thread, then only one of the instructions is inserted (520) into the data path for execution. For some embodiments, a higher priority instruction is inserted (520) into the data path over a lower priority instruction. It should be appreciated that the priority of the thread can be determined using the age of the thread, or a priority bit in an instruction (for those embodiments that permit priority bits within the data structure), or other known methods.

It should be appreciated that, while FIG. 5 shows the identifying steps (505, 510) as being sequential, for some embodiments, the identifying steps (505, 510) occur substantially concurrently.

Figure 6:
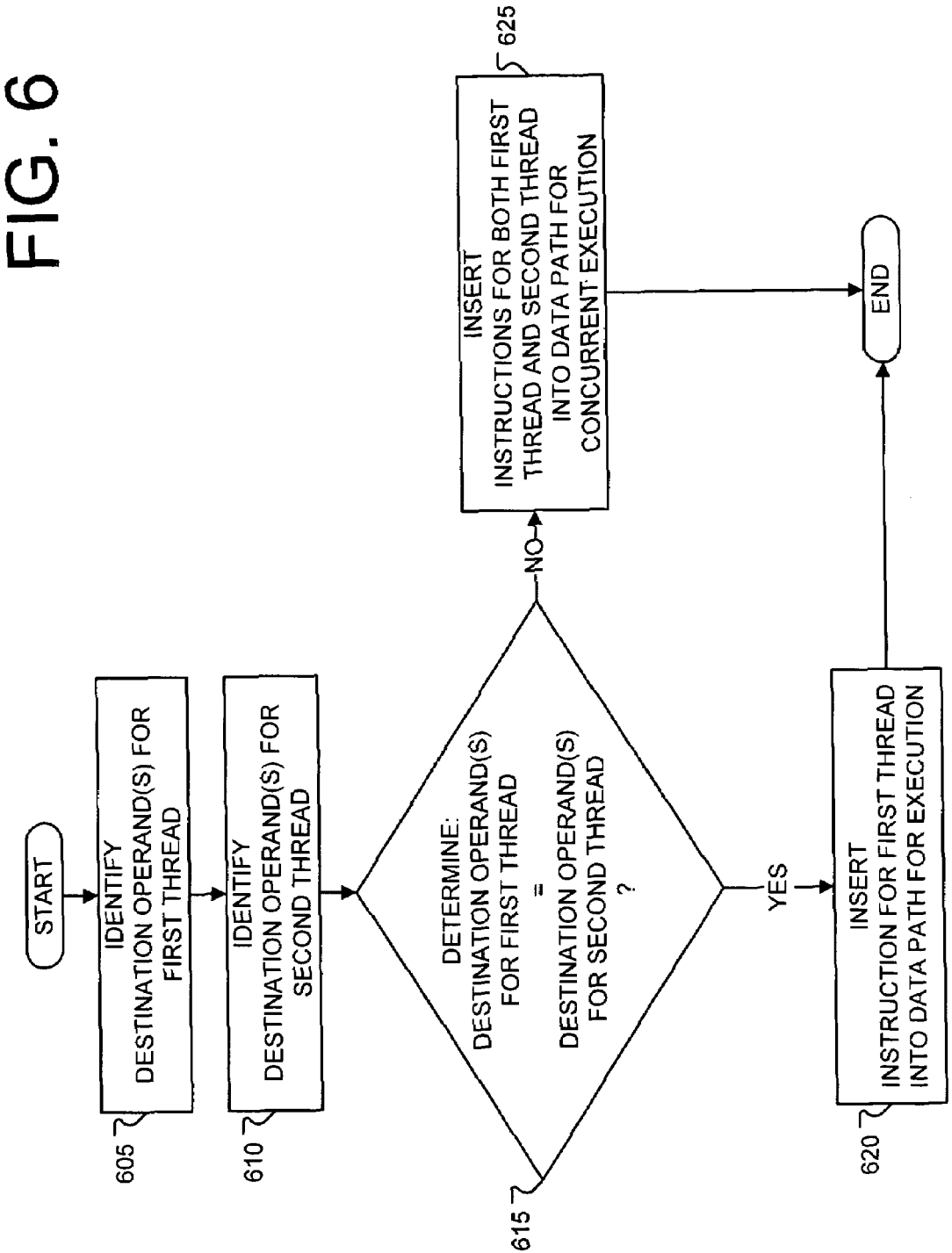
FIG. 6 is a flowchart showing another embodiment of a process for determining whether or not a conflict exists between two threads.

FIG. 6 is a flowchart showing another embodiment of a process for determining whether or not a conflict exists between two threads. While FIG. 5 shows arbitration of source operands, FIG. 6 shows arbitration of destination operands.

As shown in FIG. 6, for some embodiments, the process begins by identifying (605) one or more destination operands for a first thread, and identifying (610) one or more destination operands for a second thread. The identified destination operand(s) for the first thread are compared with the identified destination operand(s) for the second thread to determine (615) whether or not there is overlap between the destination operands of the two threads. If the destination operand(s) of the first thread are distinct from the destination operand(s) of the second thread, then instructions for both the first and second thread are inserted (625) into a processing data path for substantially concurrent execution. For some embodiments, substantially concurrent execution refers to execution during the same clock cycle. Alternatively, if there is overlap between the destination operand(s) of the first thread and the destination operand(s) of the second thread, then only one of the instructions is inserted (620) into the data path for execution.

Figure 7:
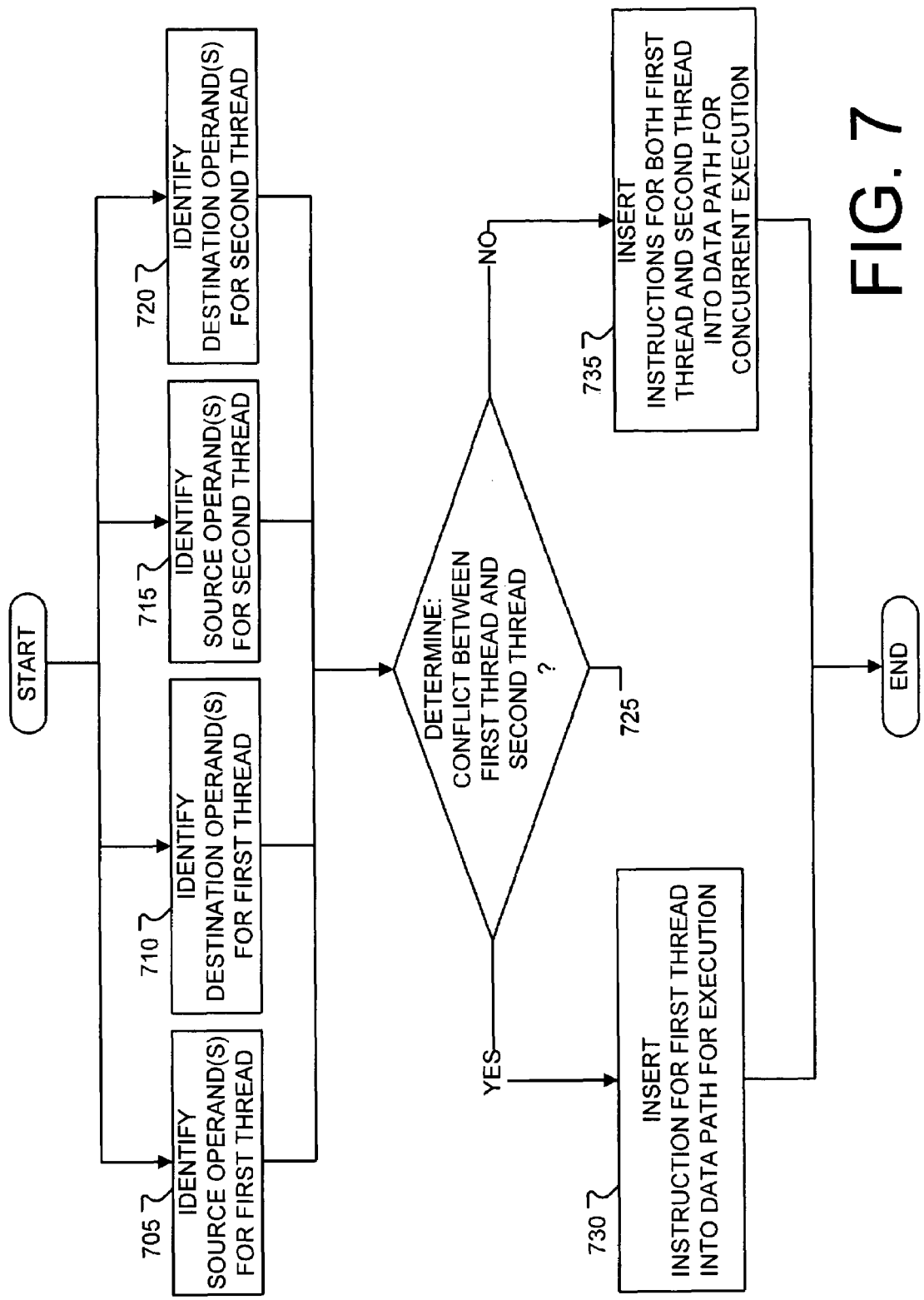
FIG. 7 is a flowchart showing yet another embodiment of a process for determining whether or not a conflict exists between two threads.

FIG. 7 is a flowchart showing yet another embodiment of a process for determining whether or not a conflict exists between two threads. In the embodiment of FIG. 7, instructions for two threads are placed in the data path only in the event that there is neither a source nor a destination conflict for those two threads. As such, the process of FIG. 7 begins by concurrently identifying (705, 715) source operands for two threads, and concurrently identifying (710, 720) destination operands for those two threads.

Upon identifying the two threads, the process determines (725) whether there is a conflict between the two threads. For some embodiments, the process determines that there is a conflict if the source operands overlap. For other embodiments, the process determines that there is a conflict if the destination operands overlap. For yet other embodiments, the process determines that there is a conflict if both the source operands and the destination operands overlap.

In any event, if the process determines that a conflict exists, then only instructions for one of the threads is inserted (730) into the data path for execution. Conversely, if the process determines that no conflict exists, then instructions for both threads are inserted (735) into the data path for concurrent execution.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. An instruction processing method, comprising the steps of:
   (A) identifying a source operand associated with a first thread;
   (B) identifying a source operand associated with a second thread;
   (C) identifying a destination operand associated with the first thread;
   (D) identifying a destination operand associated with the second thread;
   (E) determining whether the source operand associated with the second thread has a conflict with the source operand of the first thread;
   (F) determining whether the destination operand associated with the second thread has a conflict with the destination operand of the first thread;
   (G) in response to determining that no conflict exists between the source and destination operands of the first and second threads, substantially concurrently:
      (G1) directing the first thread to a first processing unit; and
      (G2) directing the second thread to a second processing unit.

2. The method of claim 1, wherein the step of identifying a source operand associated with a first thread more specifically identifies 1 to 3 source operands associated with the first thread, and wherein the step of identifying a source operand associated with a second thread more specifically identifies 1 to 3 source operands associated with the second thread.

3. The method of claim 1, wherein the step of determining whether the source operand associated with the first thread has a conflict with the source operand of the second thread more specifically comprises determining whether the operands of the first thread and the second thread indicate, from both threads, an operation selected from the group consisting of: (1) a read from an execution unit constant buffer; (2) a read from an execution unit common register file; and (3) a read from an execution unit scalar register file.

4. The method of claim 1, wherein the step of determining whether the destination operand associated with the second thread has a conflict with the destination operand of the first thread more specifically comprises determining whether the operands of the first thread and the second thread indicate, from both threads, an operation selected from the group consisting of: (1) a write to an execution unit common register file; (2) a write to an execution unit scalar register file; and (3) a write to an execution unit predicate register file.

5. The method of claim 1, further comprising the checking the availability of processing units needed to perform an operation implicated by the instruction.

6. The method of claim 1, steps (A) through (D) occurring substantially concurrently.

7. The method of claim 1, steps (A) through (F) occurring substantially concurrently.

8. The method of claim 1, steps (E) and (F) occurring substantially concurrently.

9. A multi-issue processor, comprising:
   a source arbitrator configured to determine whether a first source is different from a second source;
   a first processing unit configured to read from the first source and write to a first destination to process a first thread; and
   a second processing unit configured to read from the second source and write to a second destination to process a second thread, the second source being read in response to the source arbitrator determining that the second source is different from the first source.

10. The multi-issue processor of claim 9, further comprising means for determining whether the first destination is different from the second destination.

11. The multi-issue processor of claim 10, the means for determining comprising a logical XOR operation.

12. The multi-issue processor of claim 9, further comprising a destination arbitrator configured to determine whether the first destination is different from the second destination.

13. The multi-issue processor of claim 12, the second processing unit further being configured to read in response to determining that the first destination is different from the second destination.

14. The multi-issue processor of claim 12, the source arbitrator and the destination arbitrator further being configured to substantially concurrently make their respective determinations.

15. The multi-issue processor of claim 12, the source arbitrator and the destination arbitrator further being configured to make their respective determinations during the same clock cycle.

16. The multi-issue processor of claim 9, the first processing unit and the second processing unit further being configured to substantially concurrently read from their respective sources.

17. The multi-issue processor of claim 9, the first processing unit and the second processing unit further being configured to read from their respective sources during the same clock cycle.

18. The multi-issue processor of claim 9, the first and second processing units each being a floating-point processing unit.

19. The multi-issue processor of claim 9, further comprising a register file, the register file comprising:
   the first source;
   the first destination;
   the second source; and
   the second destination.

20. A method comprising the steps of:
   determining whether a source associated with a first thread is different from a source associated with a second thread; and substantially concurrently:

reading an instruction associated with the first thread; and reading an instruction associated with the second thread in response to determining that the source associated with the first thread is different from the source associated with the second thread.

21. The method of claim 20, further comprising the step of determining whether a destination associated with the first thread is different from a destination associated with the second thread.

22. The method of claim 21, the step of reading the instruction for the second thread further being responsive to determining that the destination associated with the first thread is different from the destination associated with the second thread.

23. The method of claim 21, the step of determining the source and the step of determining the destination occurring substantially concurrently.

* * * * *